E. A. JOHANSSON.
CONDENSER FOR ZINC AND LEAD VAPORS.
APPLICATION FILED APR. 21, 1915.
1,145,685.
Patented July 6, 1915.
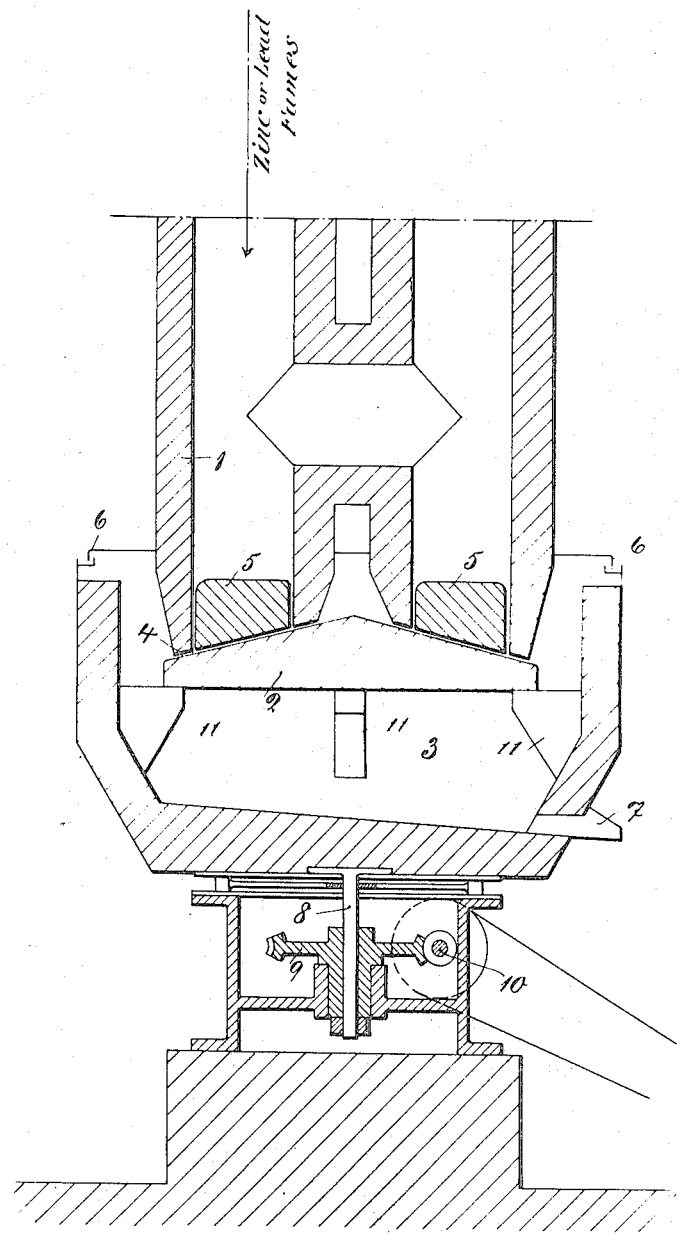

UNITED STATES PATENT OFFICE.

EDVIN ANDREAS JOHANSSON, OF TROLLHÄTTAN, SWEDEN.

CONDENSER FOR ZINC AND LEAD VAPORS.

1,145,685.   Specification of Letters Patent.   Patented July 6, 1915.

Application filed April 21, 1915.   Serial No. 22,788.

*To all whom it may concern:*

Be it known that I, EDVIN ANDREAS JOHANSSON, engineer, residing at Trollhättan, Sweden, have invented certain new and useful Improvements in Condensers for Zinc and Lead Vapors, of which the following is a specification.

The present invention has for its object an apparatus for condensing zinc and lead vapors, and consists in means for subjecting the metal grains, usually called poussière, and formed during the condensing operation, while remaining in the condenser, to a stirring operation, whereby the metal grains are caused to commingle or flow together so as to form liquid metal.

In order to make the invention fully understood reference is made to the annexed drawing which shows a vertical section of the lower part of a condenser for condensing volatile vapors, such as zinc and lead vapors.

1 indicates the condenser, the bottom 2 of which according to the invention is movable and may be rotated by any suitable means. Within the condenser 1 one or more stones 5 are provided on said bottom, said stones during the rotation of the condenser bottom 2 act upon the poussière, so that a stirring operation results, whereby the metal grains are caused to flow together or to commingle to liquid metal, which flows down through the opening 4 to a chamber 3, placed beneath the condenser, said opening constituting the space between the outer edge of the bottom 2 and the condenser wall 1. The chamber 3 may be arranged in such a manner that it can be removed from the condenser.

According to the construction shown the bottom 2 is supported by the walls of the chamber 3 through the intermediary of brackets or lugs 11 projecting from the walls of the chamber 3 and on which the bottom 2 rests. The chamber is sealed against the atmosphere by means of sand traps 6. It is provided with a tapping hole 7, and is rotated together with the bottom 2 by means of the shaft 8, the worm wheel 9 and worm 10, from a suitable power source.

Having now described my invention what I claim as new is:

1. In an apparatus for condensing volatile vapors a condenser, having a loose bottom, and means for rotating said bottom.

2. In an apparatus for condensing volatile vapors a condenser, having a loose bottom, a space between said bottom and the walls of the condenser, means for rotating said bottom, and a chamber beneath the condenser for collecting the condensed material.

3. In an apparatus for condensing volatile vapors a condenser, having a loose bottom, supported by a chamber, placed beneath the condenser, and means for rotating said bottom.

4. In an apparatus for condensing volatile vapors a condenser, having a loose bottom, supported by a chamber, placed beneath the condenser, means for sealing said chamber against the atmosphere, and means for rotating said chamber.

In testimony whereof I have affixed my signature in presence of two witnesses.

EDVIN ANDREAS JOHANSSON.

Witnesses:
　HUGO LINDBORG,
　BEMLE OUSCU.